May 10, 1960 E. KELGARD ET AL 2,935,978
MOISTURE CONTROL FOR ENGINES
Filed May 7, 1958 2 Sheets-Sheet 1

Inventors
Erik Kelgard
Thomas B. McMeekin
by Parker & Carter
Attorneys

May 10, 1960

E. KELGARD ET AL 2,935,978

MOISTURE CONTROL FOR ENGINES

Filed May 7, 1958

Inventors
Erik Kelgard
Thomas B. McMeekin
by Parker & Carter
Attorneys

2,935,978
MOISTURE CONTROL FOR ENGINES

Erik Kelgard, Kamloops, British Columbia, Canada, and Thomas B. McMeekin, Belmont, Calif., assignors to Nordberg Manufacturing Company, Milwaukee, Wis., a corporation of Wisconsin Application May 7, 1958, Serial No. 733,672

8 Claims. (Cl. 123—119)

Our invention is in the field of internal combustion engines and is concerned with what we shall refer to as a moisture or water problem.

For many years the presence of free water in an engine's inlet air system has been a problem. This has been aggravated in recent years due to the extensive and almost universal use of superchargers and intercoolers.

If free water is formed in the engine's inlet line due to the ambient air having a high humidity and being compressed in the supercharger and cooled in the intercooler, a number of unfavorable consequences may occur. For example, the first and most obvious is corrosion. For engines that operate in high humidity climates, the down time for repair, maintenance and upkeep due to corrosion can be tremendous. Secondly, free water in the cylinders will, during compression, steal or rob the compressed air of heat because the free water will vaporize. This heat might otherwise be used to raise the temperature of the air. Thus, the final compression temperature of the air at top dead center will be lowered somewhat. This results in ignition delay which causes rapid burning of the fuel and on occasion has resulted in an explosive combustion rather than smooth even burning of the fuel. The immediate end result is less power from the engine. The net result is a reduction in thermal efficiency on a day-to-day basis and an increase in engine deterioration in the long run.

To combat this, we have devised a method of operating an engine and apparatus for carrying it out that will either prevent the formation of free water or, if it is formed, will provide for its removal.

A primary object of our invention is a method of operating an engine to reduce or prevent corrosion.

Another object is a supercharged, intercooled engine controlled and operated so that free water will not be formed in the inlet manifold.

Another object is an engine automatically controlled so that moisture will be removed, in the form of free water, from the inlet air and at the same time the air in the inlet manifold will be at the engine's rated temperature.

Another object is a method of automatically controlling the inlet air system for a supercharged, intercooled engine so as to simultaneously remove free water and to supply air to the engine at its rated temperature.

Other objects will appear from time to time in the ensuing specification and drawings in which.

Figure 1:
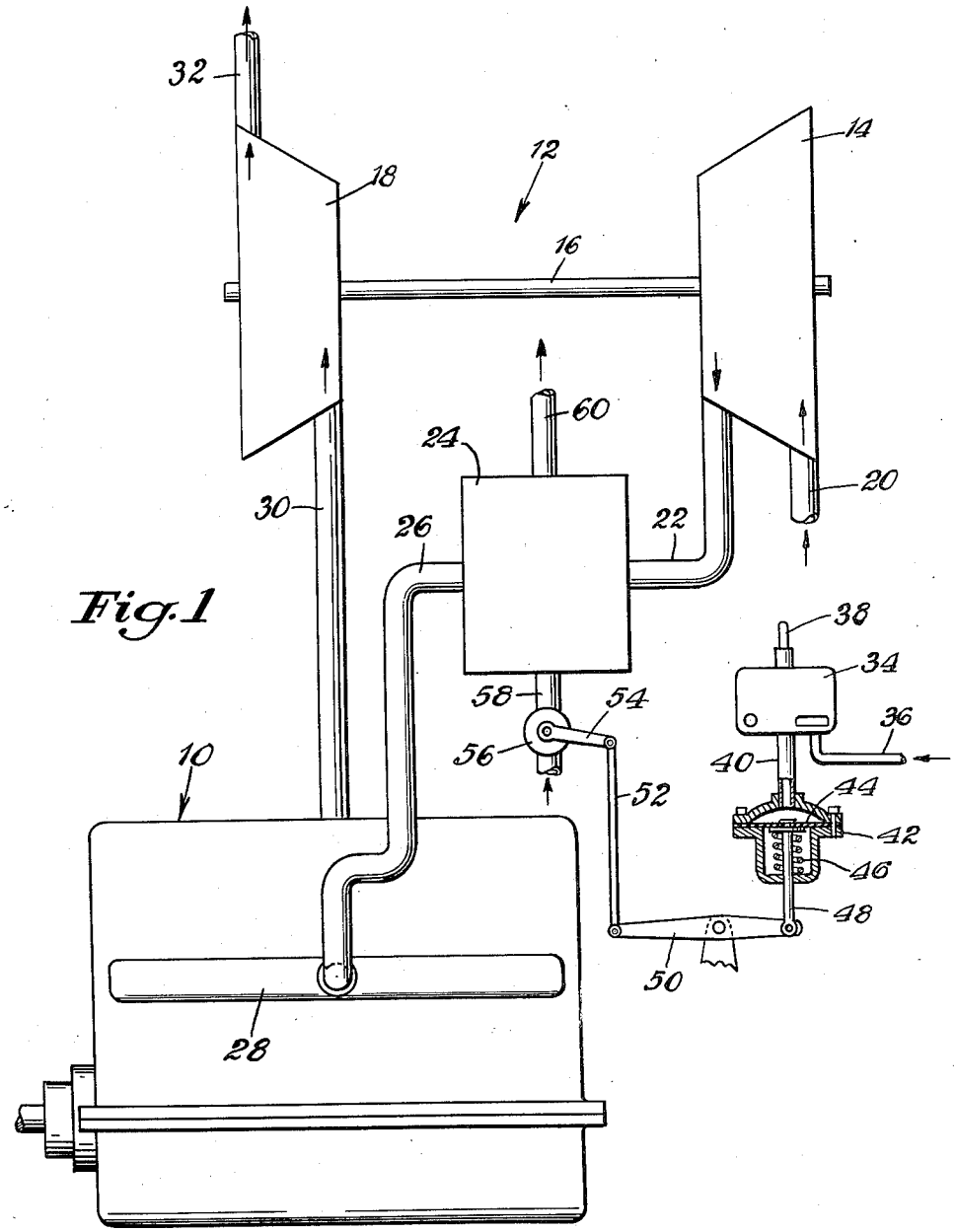
Figure 1 is a diagrammatic illustration of an engine layout with our invention.

In Figure 1, we have indicated an engine generally at 10. The details of the engine are unimportant. It might be a diesel engine, a dual fuel engine, or a spark fired engine. It might be either two cycle, four cycle, opposed piston, or otherwise. Its specific use or application also is unimportant.

A supercharger is indicated generally at 12 and includes a compressor 14 coupled by any suitable means 16 to a turbine 18. The compressor draws in inlet air through a suitable inlet 20 and discharges it through a duct 22 or the like to an intercooler 24. After the air is cooled, it is supplied by a suitable duct 26 or the like to a suitable inlet manifold 28 for the engine. The exhaust manifold, not shown, supplies the exhaust gases through a suitable duct 30 or the like to the turbine 18 of the supercharger and the spent products of combustion may be suitably disposed of through a pipe 32 or the like. To this point, the structure is conventional. While we have referred to inlet and exhaust manifolds, the engine might have any suitable duct work to accomplish this purpose. The important point is that the engine has a supercharger and an intercooler.

In high temperature, moist climates, tropical or otherwise, the intercooler will reduce the temperature of the air below the dew point. Therefore, the air being supplied to the engine will be below the dew point and the moisture carried in the air will be condensed and will come out as free water.

To prevent this, we control the intercooler so that the outlet temperature of the air supplied to the engine is above the dew point. For example, in Figure 1, a suitable controller as been indicated at 34. This controller may be supplied with relatively high pressure air from a suitable source indicated generally at 36. The controller may have a suitable psychrometer type bulb 38 which responds to the humidity of the air. In accordance with the humidity, the controller varies the pressure of the air supplied through a duct 40 or the like to an air motor 42. The air motor may be conventional and may have a diaphragm 44 or the like, which is biased by a suitable spring 46 with a rod 48 connected to the diaphragm and to a lever 50. The lever 50 may be connected to a link 52 which is connected to an arm 54 on a suitable valve 56 or the like that controls the cooling fluid for the intercooler. For example, the inlet duct for the intercooler fluid is indicated at 58 and the outlet duct at 60. The cooling fluid for the intercooler in all probability will be water, but it might be otherwise.

Depending upon the humidity of the inlet air, the bulb 38 varies the pressure of the air supplied from the source 36 to the air motor so that the linkage mechanism running to the control valve 56 for the intercooler will be actuated to open or close the valve. For example, if the humidity is high, the mechanism will close the valve 56 somewhat so that less fluid will flow through the intercooler and this will raise the outlet temperature of the air from the intercooler going to the engine. If the humidity is low, the mechanism will open the valve 56 more so that the outlet temperature of the air will be reduced.

The details of the mechanism for controlling the valve 56 are unimportant so long as it is controlled in accordance with the humidity. While we have shown the control mechanism tied to the valve for the intercooler, it could as well be tied to the pump that circulates the cooling fluid to vary the speed of the pump. The important point is that the intercooler is controlled so that the outlet temperature of the air is above the dew point at all times.

We have shown the bulb 38 as responsive to the humidity of the ambient air but the bulb might be positioned in the line 26 or in the inlet manifold 28 so that it would respond to the humidity of the air going to the engine. In this case, the controller would operate so that the humidity of the air supplied to the engine would always be below 100% humidity and the intercooler would be controlled so that the temperature of the air from it would be as low as possible without going over 100% humidity. The central valve 56 could as well be in the outlet line 60.

Figure 2:
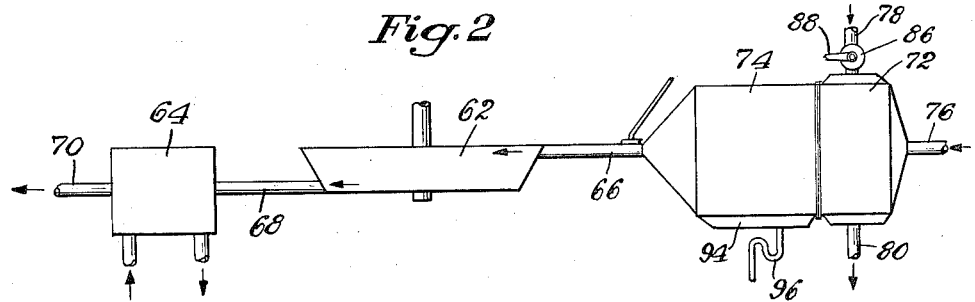
Figure 2 is a diagrammatic layout, similar to Figure 1, but of a variation and with parts omitted.

In Figure 2, we have shown a variation. A suitable compressor is indicated at 62 and an intercooler at 64. The inlet line to the compressor is indicated at 66, the line between the compressor and the intercooler is indicated at 68, and the duct leading to the engine is indicated at 70. In Figure 2 we have not shown the engine and it could be the same as before.

Figure 3:
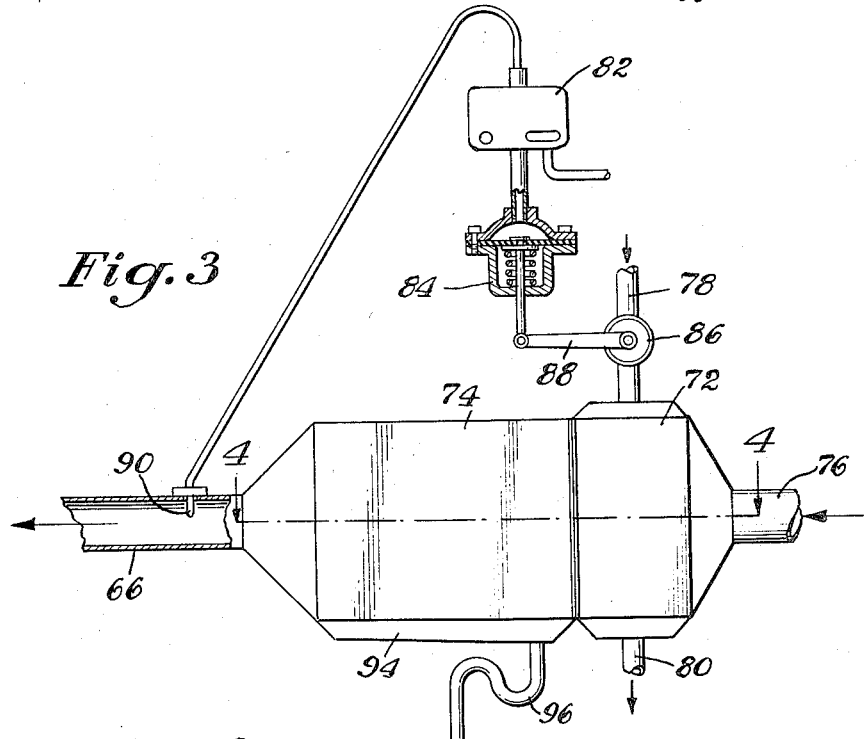
Figure 3 is an enlarged view of a portion of Figure 2.

In the inlet duct leading to the compressor we position a cooler 72 and a suitable moisture trap 74. Inlet air is drawn in through a suitable pipe or the like 76 and passes through the cooler 72 initially. A suitable cooling fluid is supplied to the cooler through a pipe 78 or the like and is exhausted through a pipe 80 or otherwise. As shown more in detail in Figures 3 and 4, the cooler may have a plurality of somewhat upright or horizontally arranged tubes 81 through which the cooling fluid flows. In any event, the details of the cooler as such are unimportant.

In this arrangement, we provide a cooler both ahead of and behind the compressor. We operate the first cooler, in the order of air flow, so that its outlet temperature will be below the dew point. The same type of control may be used on the first cooler as is shown in the Figure 1 form. For example, in Figure 3 a controller 82 of any suitable type is shown with an air motor 84 which controls a suitable valve 86 in the fluid inlet line to the cooler through a suitable linkage 88. A humidity responsive bulb 90 of the psychrometric type may be positioned in the duct 66 leading to the compressor. Or it might be otherwise, for example, it might be responsive to the humidity of the ambient or outside air. In any event, the important point is that the controller regulates the first cooler so that the outlet temperature of the air from that cooler is below the dew point. Therefore, free water will be formed in the line leading to the compressor.

Figure 4:
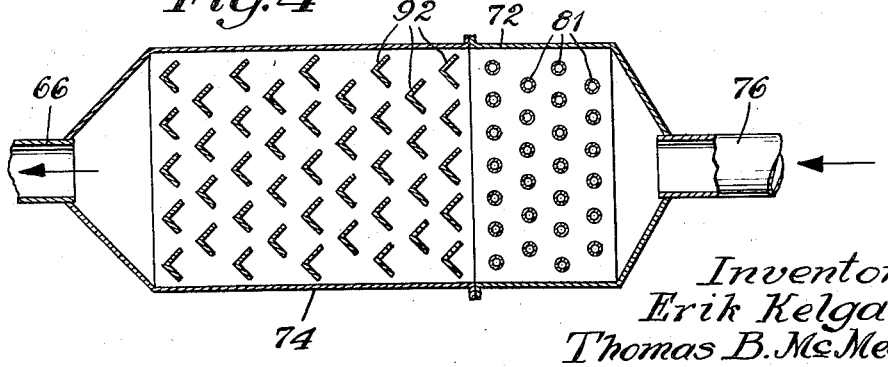
Figure 4 is a section along line 4—4 of Figure 3.

The moisture trap 74 may take the form of a suitable housing with a plurality of vertically arranged channels 92 or the like in staggered relationship or otherwise as shown in Figure 4. The housing may have a suitable sump 94 to collect the moisture that drains down from the open faced channel 92 and a moisture trap or S shaped elbow 96 may be used to dispose of the collected water. The details of the moisture or water removing device are unimportant and the one illustrated is merely diagrammatic. The point is that after the first cooler, we provide a water removing mechanism which removes the thus formed free water.

The air from the moisture trap 74 in the line 66 to the compressor will be at 100% humidity. The compressor raises the temperature and pressure of the air substantially and the relatively hot high pressure air will be supplied to the intercooler 64. This intercooler is not concerned with moisture but is purely a temperature conditioner. We prefer that this intercooler reduce the temperature of the air to a point above the air's dew point so that free water will not be formed in the line 70 leading to the engine.

In the Figure 2 form, we provide two coolers, one ahead of and the other behind the compressor. The first cooler is used for moisture control and we deliberately reduce the outlet temperature of the air from the first cooler below the dew point of the air so that free water will be collected in the duct and may be removed in a suitable moisture trap. After the air is compressed, the second cooler reduces the temperature of the air to a value consistent with the engine. The second cooler is not concerned with moisture control and may be considered purely a temperature conditioner.

The use, operation and function of our invention are as follows:

We are concerned with free water in supercharged, intercooled engines.

In the Figure 1 form, we control the intercooler so that the outlet temperature of the air to the engine will be above the air's dew point. We have shown an exhaust driven supercharger, commonly termed a turbocharger, but this is merely for purposes of illustration and the supercharger might be driven by the engine crankshaft. The same is true of Figure 2 where we have shown no specific drive for the compressor and any type might be used.

In Figure 1, we have shown the intercooler control responsive to the humidity of the ambient air but, as stated before, it might be responsive to the humidity of the air in the inlet side or inlet manifold of the engine.

We prefer that the Figure 2 form be constructed and arranged so that the temperature of the air in the inlet manifold be at or approximately at the rated temperature for the engine. It will be understood that engines are constructed and given a certain horsepower rating based upon an assumed inlet temperature of the inlet air. For example, a common rated temperature is 68° F. But this is only an example. We prefer that the second cooler be automatically controlled so that the air in the line 70 leading to the engine will always be at this rated temperature. In this sense, the cooler 64 may be considered a constant temperature intercooler and we shall refer to it as such with the understanding that many commercial units of this general type are on the market and are well known. Accordingly, we shall not go into detail.

As an example of the above, assume that the engine is rated at 100° F. And also assume that the engine is operating in a relatively hot, moist climate and that the ambient air is at 14.7 lbs. p.s.i. and 100° F. Therefore, the entire system of two coolers and a compressor, one cooler ahead of the compressor and the other behind, should be controlled so that the second cooler may reduce the temperature of the air supplied to the engine to a value corresponding to the engine's rated temperature without going below the dew point. Therefore, this requires that the first cooler be controlled so that its outlet air is reduced to a temperature, not only below the dew point, but to a value that will remove enough of the moisture from the air so that the second cooler may take the air down to the engine's rated temperature without precipitation.

In the example stated above, the first cooler might drop the temperature of the air from the 100° F. ambient to 50° F. Across this first cooler, the pressure of the air would stay approximately constant at 14.7 lbs. p.s.i. This is well below the dew point and the free water would be removed. The compressor would take the air and raise its pressure and temperature to something on the order of 22 lbs. p.s.i. and 210° F. The second cooler would maintain the pressure of the air approximately constant at 22 lbs. p.s.i. but would drop the temperature from 210° F. to the rated temperature of the engine, for example, 100° F. These figures are only given as typical values and in no sense is the invention tied to these temperatures and pressures.

The important point is that the outlet temperature of the air from the first cooler is dropped to a point to remove sufficient moisture so that the second cooler may bring the air down to the engine's rated temperature without fear of free water.

While we have shown the humidity responsive bulb as positioned in the line 66 between the first cooler and the compressor, this bulb might also be positioned in the line 70 leading from the second cooler to the engine or in the inlet manifold so that if the humidity of the air supplied to the engine approaches 100%, the first cooler could be adjusted so that its outlet temperature would be lower, thereby precipitating more water out of the air to be removed by the water trap 74. In a sense, the second cooler could also be tied to the air in the inlet manifold. But it would respond to temperature and such a control unit would control or govern the second cooler so that the inlet air in the manifold would be constant and at or approximately at the engine's rated temperature.

The important point is that the first cooler controls moisture and the second cooler controls temperature. The compressor is positioned between them so that the air, when it gets to the second cooler, is at a high temperature and pressure. Therefore, the air supplied to the engine for combustion will be dense, cool and moisture free. Accordingly, the engine will not have a corrosion problem, will not be subject to ignition delay causing a loss of power, and will operate smoothly and efficiently at all times.

While we have shown and described a preferred form and suggested several variations of our invention, as well as illustrating a species, numerous additional modifications, changes, substitutions and alterations may be made without departing from the invention's fundamental theme. For example, the water or moisture trap might be a centrifugal unit. With these and various other modifications in mind, we wish that the invention be unrestricted, except as by the appended claims.

We claim:

1. A method of operating an internal combustion engine, including the steps of compressing the inlet air to an elevated temperature and pressure, cooling the air to a reduced temperature above its dew point to prevent the formation of free water, and supplying the compressed cooled air to the engine.

2. For use with an internal combustion engine, a compressor for supplying relatively high pressure inlet air for the engine, an intercooler for withdrawing at least a part of the heat of compression from the air before it is supplied to the engine, and a control for the intercooler for automatically maintaining the inlet temperature of the air from the intercooler above the dew point.

3. The structure of claim 2 further characterized in that the control is responsive to the humidity of the air between the intercooler and the engine.

4. The structure of claim 2 further characterized in that the control is responsive to the humidity of the ambient air.

5. A method of operating an internal combustion engine, including the steps of initially cooling the inlet air to a predetermined temperature sufficiently below its dew point such that free water will be formed, removing the thus formed free water from the inlet air, compressing the inlet air to a substantially elevated temperature and pressure, cooling the air to a substantially reduced temperature above its dew point while maintaining its pressure approximately constant, and supplying the high pressure cool air to the engine.

6. The method of claim 5 further characterized by the step of cooling the air, after the compressing step, to a temperature corresponding generally to the engine's rated temperature.

7. In an internal combustion engine, a cylinder and piston, a cooler for reducing the temperature of the inlet air below its dew point to form free water, a moisture trap after the cooler for removing the thus formed water, a compressor after the moisture trap for substantially raising the pressure and temperature of the inlet air, an intercooler after the compressor for substantially reducing the temperature of the air while maintaining its pressure approximately constant, said intercooler being constructed to cool the air to a temperature above its dew point, and means for supplying the compressed cooled air to the cylinder.

8. The structure of claim 7 further characterized in that the intercooler is constructed to automatically reduce the temperature of the inlet air to the engine's rated temperature, the cooler, compressor and intercooler being constructed such that the dew point of the air after the intercooler will be below the engine's rated temperature.

References Cited in the file of this patent

UNITED STATES PATENTS 2,703,561    Froehlich _____ Mar. 8, 1955